United States Patent
Harashina

(10) Patent No.: US 6,673,405 B2
(45) Date of Patent: Jan. 6, 2004

(54) POLYACETAL RESIN COMPOSITION AND PROCESS FOR ITS PRODUCTION

(75) Inventor: Hatsuhiko Harashina, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 2 days.

(21) Appl. No.: 10/129,929

(22) PCT Filed: Sep. 18, 2001

(86) PCT No.: PCT/JP01/08085

§ 371 (c)(1), (2), (4) Date: May 13, 2002

(87) PCT Pub. No.: WO02/24807

PCT Pub. Date: Mar. 28, 2002

(65) Prior Publication Data

US 2003/0036591 A1 Feb. 20, 2003

(30) Foreign Application Priority Data

Sep. 21, 2000 (JP) .................................. 2000-287335

(51) Int. Cl.[7] .................. B29D 22/00; C08K 5/34
(52) U.S. Cl. ............... 428/35.7; 525/398; 525/400; 524/86; 524/81; 524/96; 524/100; 524/110; 524/115; 524/107; 524/129; 524/284; 524/356; 524/359; 524/401; 524/91; 428/31; 428/423.1; 428/524; 428/931
(58) Field of Search .................. 525/398, 400; 524/86, 81, 91, 96, 100, 107, 129, 110, 115, 284, 356, 359, 401; 428/35.7, 31, 423.1, 524, 931

(56) References Cited

FOREIGN PATENT DOCUMENTS

| EP | 0 151 042 | 8/1985 |
|---|---|---|
| EP | 0 289 142 | 11/1988 |
| JP | 62-190248 | 8/1987 |
| JP | 4-14709 | 3/1992 |
| JP | 2000/119485 | 4/2000 |
| WO | WO 98/21280 | 5/1998 |
| WO | WO 98/29510 | * 7/1998 |

* cited by examiner

Primary Examiner—Samuel A. Acquah
(74) Attorney, Agent, or Firm—Nixon & Vanderhye PC

(57) ABSTRACT

About 0.001 to 5 parts by weight of a hindered phenol-series compound, about 0.01 to 5 parts by weight of a weather (light)-resistant stabilizer, and about 0.001 to 10 parts by weight of a spiro-compound having a triazine ring are added to 100 parts by weight of a polyacetal resin. The spiro-compound may be a compound represented by the following formula (1). The polyacetal resin composition may further comprise a coloring agent, a processing stabilizer, a heat stabilizer, and others.

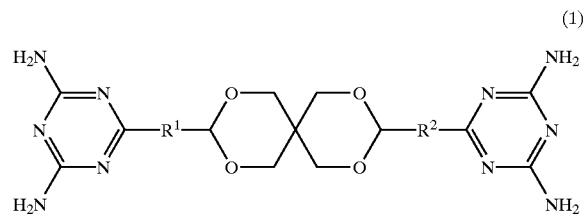

(1)

wherein $R^1$ and $R^2$ are the same or different, each representing an alkylene group, an arylene group, or an aralkylene group.

26 Claims, No Drawings

POLYACETAL RESIN COMPOSITION AND PROCESS FOR ITS PRODUCTION

This application is the US national phase of international application PCT/JP01/08085 filed Sep. 18, 2001 which designated the U.S.

TECHNICAL FIELD

The present invention relates to a polyacetal resin composition having excellent weather (light)-resistance and effectively inhibited from emitting (or generating) formaldehyde, to a process of producing the same, and to shaped or molded articles formed with the resin composition.

BACKGROUND ART

A polyacetal resin is inherently unstable in an oxidative atmosphere at an elevated temperature or in an acidic or alkaline environment because of its chemical structure. Therefore, the essential need that must be fulfilled for a polyacetal resin is that of insuring high thermal stability and minimal emission (or generation) of formaldehyde in the course of processing and from shaped articles. In the case of having low thermal stability, a polyacetal resin is heated during a processing step such as extruding or molding to decompose or resolve a polymer thereof, as a result formation or generation of a deposit on a mold (mold deposit) occurs, and the moldability, the mechanical property and others are deteriorated. Formaldehyde generated from decomposition or resolution of a polyacetal resin is chemically active and ready to be oxidized to formic acid to thereby adversely affect the heat resistance of resin and, when the resin is used as electrical or electronic parts, cause corrosion of metallic contacts or their discoloration due to organic deposits, resulting in contact errors. Furthermore, formaldehyde as such contaminates the working environment for parts assembling and the ecology in the field of use of end products.

Therefore, in order to stabilize a polyacetal resin, an antioxidant or other stabilizer has been used. As the antioxidant added to the polyacetal resin, a phenol-series (phenolic) compound having steric hindrance (hindered phenol), an amine compound having steric hindrance (hindered amine), and others have been known. As other stabilizers, melamine, a polyamide, an alkaline metal hydroxide, an alkaline earth metal hydroxide, and others have been used. Moreover, antioxidants are generally used in combination with other stabilizers. However, even when such an additive(s) is/are used, it is difficult to give the polyacetal resin high stability.

Moreover, with the increasing scope and diversification of application of a polyacetal resin, the resin is required to satisfy more and more sophisticated requirements in quality. Furthermore, depending on the use, the polyacetal resin is influenced by a circumferential environment such as ultraviolet rays, wind and rain, temperature, oxygen in the atmosphere, ozone, artificial light and loading on the use. As a result, the polyacetal resin has some problems such as a change of color (or discoloration), a change in quality and degradation (or aging).

Japanese Patent Publication No. 14709/1992 (JP-4-14709B) discloses a polyacetal resin composition in which a polyacetal resin is blended with a hindered amine-series antioxidant, an antistatic agent, and a guamanine derivative such as 3,9-bis[2-(3,5-diamino-2,4,6-triazaphenyl)ethyl]-2,4,8,10-tetraoxaspiro[5.5]undecane (CTU guanamine), to raise high thermal stability and improve the propensity for discoloring caused by a magnetic tape. In this literature, in order to decrease discoloration of the polyacetal resin, a hindered amine-series antioxidant is used instead of a conventional hindered phenol-series (phenolic) antioxidant. Moreover, Japanese Patent Application Laid-Open No. 190248/1987 (JP-62-190248A) discloses a stabilized polyacetal resin composition in which a polyacetal resin is blended with a guanamine derivative (such as benzoguanamine) as a stabilizer to decrease a formaldehyde smell thereof and improve a moldability thereof. However, these resin composition are not capable of having practically enough weather(ing) (light)-resistance, and it is difficult to apply to a use which needs weather (light)-resistance.

Therefore, an object of the present invention is to provide a polyacetal resin composition given excellent weather (light)-resistance, particularly a polyacetal resin composition prevented from degrading or aging due to light after molding, and a process of producing the same, as well as shaped articles made or formed with the polyacetal resin composition.

It is another object of the invention to provide a polyacetal resin composition conducive to a marked inhibition of formaldehyde emission at a low level of addition and contributory to improvements in the circumferential environment, and a process of producing the same, as well as shaped articles as molded therefrom.

It is a still another object of the invention to provide a polyacetal resin composition adapted to inhibit emission of formaldehyde even under severe conditions to suppress deposition of decomposition products on the mold and blooming or bleeding of such products from a shaped article and thermal deterioration of the article, thus contributing to upgrading of the moldability of the shaped articles, and a process of producing the same.

DISCLOSURE OF INVENTION

The inventors of the present invention made intensive studies on a series of nitrogen-containing compounds about a stabilizer of a polyacetal resin to achieve the objects mentioned above, and finally found that certain spiro-compounds give remarkable effects as a stabilizer of the polyacetal resin and are capable of greatly improving weather (light)-resistance of the polyacetal resin by using a hindered phenol-series (phenolic) compound and a weather (light)-resistant stabilizer (a stabilizer for weather (light)-resistance) in combination. The present invention was accomplished based on the above finding.

That is, the polyacetal resin composition of the present invention comprises a polyacetal resin, a hindered phenol-series (phenolic) compound, a weather (light)-resistant stabilizer and a spiro-compound having a triazine ring. The weather (light)-resistant stabilizer (weather(ing) (light) stabilizer) may comprise at least one member selected from the group consisting of a benzotriazole-series compound, a benzophenone-series compound, an aromatic benzoate-series compound, a cyanoacrylate-series compound, an oxalic anilide-series compound, and a hindered amine-series compound. The weather (light)-resistant stabilizer may comprise at least a benzotriazole-series compound, particularly a benzotriazole-series compound and a hindered amine-series compound. The spiro-compound may have two guanamine rings as its end groups. For example, the spiro-compound may be a compound represented by the following formula (1):

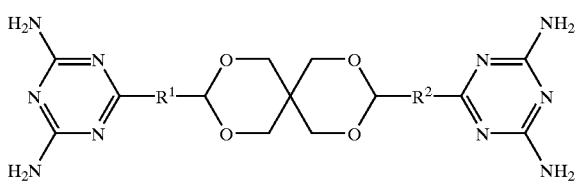

(1)

wherein $R^1$ and $R^2$ are the same or different, each representing an alkylene group, an arylene group, or an aralkylene group.

The polyacetal resin composition may comprise, relative to 100 parts by weight of the polyacetal resin, about 0.001 to 5 parts by weight of the hindered phenol-series compound, about 0.01 to 5 parts by weight of the weather (light)-resistant stabilizer, and about 0.001 to 10 parts by weight of the spiro-compound. The polyacetal resin composition may further comprise a coloring agent, aprocessing stabilizer, a heat stabilizer, and others.

In the process of the present invention, a polyacetal resin composition is produced by mixing a polyacetal resin, a hindered phenol-series compound, a weather (light)-resistant stabilizer, and a spiro-compound having a triazine ring. Furthermore, the present invention includes a shaped or molded article comprising the polyacetal resin composition.

BEST MODE FOR CARRYING OUT THE INVENTION

The resin composition of the present invention comprises a polyacetal resin, a hindered phenol-series compound, a weather (light)-resistant stabilizer and a spiro-compound having a triazine ring.

Polyacetal Resin

The polyacetal resin is a macromolecular compound containing oxymethylene group (—$CH_2O$—) as a predominant constituent unit and includes polyacetal homopolymers (e.g. trade name "Delrin", manufactured by DuPont, U.S.A.; trade name "Tenac 4010", manufactured by Asahi Chemical Industry Co., Ltd.; etc.) and polyacetal copolymers comprising at least one other comonomer unit in addition to the oxymethylene unit (e.g. trade name "Duracon", manufactured by Polyplastics Co., Ltd.). Referring to such copolymers, the comonomer unit includes oxyalkylene units of about 2 to 6 carbon atoms (preferably about 2 to 4 carbon atoms), for example, oxyethylene (—$CH_2CH_2O$—), oxypropylene, and oxytetramethylene units. The proportion of such comonomer unit may be small and can be selected from the range of about 0.01 to 20 mole %, preferably about 0.03 to 10 mole % (e.g. 0.05 to 9 mole %), more preferably about 0.1 to 8 mole %, relative to the whole polyacetal resin.

The polyacetal copolymer may for example be a two-component copolymer, a terpolymer and so on. The polyacetal copolymer may also be a random copolymer, a block copolymer (e.g., Japanese Patent Publication No. 24307/1990 (JP-2-24307B), manufactured by Asahi Chemical Industry, Co., Ltd., trade name "Tenac LA", "Tenac LM"), or a graft copolymer. Moreover, the polyacetal resin may be linear or branched, and may have a crosslinked structure. In addition, the end groups of the polyacetal resin may have been stabilized by esterification with a carboxylic acid such as acetic acid, propionic acid, or its anhydride. There is no particular limitation on the degree of polymerization, the degree of branching, or the degree of crosslinking, only provided it can be melt-molded. There is no particular restriction as to the molecular weight of the polyacetal resin, and the weight average molecular weight is about 5,000 to 500,000, preferably about 10,000 to 400,000.

The polyacetal resin can be produced by polymerizing an aldehyde such as formaldehyde, paraformaldehyde, and acetaldehyde; or a cyclic ether or cyclic formal such as trioxane, ethylene oxide, propylene oxide, butylene oxide, styrene oxide, cyclohexene oxide, 1,3-dioxolane, diethylene glycol formal, and 1,4-butanediol formal. Further, as the copolymerizable component, an alkyl or arylglycidyl ether (e.g., methylglycidyl ether, ethylglycidyl ether, phenylglycidyl ether, naphthylglycidyl ether), an alkylene or polyoxyalkylene glycol diglycidyl ether (e.g., ethylene glycol diglycidyl ether, triethylene glycol diglycidyl ether, butanediol diglycidyl ether), an alkyl or aryl glycidyl alcohol, a cyclic ester (e.g., β-propiolactone), or a vinyl compound (e.g., styrene, vinyl ether) can be employed.

Hindered Phenol-series Compound

The hindered phenol-series compound includes a conventional phenol-series antioxidant, for example, a monocyclic hindered phenolic compound (e.g., 2,6-di-t-butyl-p-cresol), a polycyclic hindered phenolic compound in which rings are connected or bonded to each other through a hydrocarbon group or a group containing a sulfur atom [a $C_{1-10}$alkylenebis to tetrakis(t-butylphenol) such as 2,2'-methylenebis(4-methyl-6-t-butylphenol), 4,4'-methylenebis(2,6-di-t-butylphenol) and 1,1,3-tris(2-methyl-4-hydroxy-5-t-butylphenyl)butane; a $C_{2-10}$alkenylene or dienylene-bis to tetrakis(t-butylphenol) such as 4,4'-butylidenebis(3-methyl-6-t-butylphenol); a $C_{6-20}$arylene or aralkylene-bis to tetrakis(t-butylphenol) such as 1,3,5-trimethyl-2,4,6-tris(3,5-di-t-butyl-4-hydroxybenzyl)benzene; a bis(t-butylphenol) in which t-butylphenol groups are connected or bonded to each other through a group having a sulfur atom, for example, 4,4'-thiobis(3-methyl-6-t-butylphenol)], a hindered phenolic compound having an ester group or an amide group [a t-butylphenol having a $C_{2-10}$alkylenecarbonyloxy group, exemplified by n-octadecyl-3-(4'-hydroxy-3',5'-di-t-butylphenyl)propionate and n-octadecyl-2-(4'-hydroxy-3', 5'-di-t-butylphenyl)propionate; a bis to tetrakis(t-butylphenol) in which t-butylphenol groups are connected or bonded to each other through a polyol ester of a fatty acid, exemplified by 1,6-hexanediol-bis[3-(3,5-di-t-butyl-4-hydroxyphenyl)propionate], triethylene glycol-bis[3-(3-t-butyl-5-methyl-4-hydroxyphenyl)propionate] and pentaerythritol tetrakis[3-(3,5-di-t-butyl-4-hydroxyphenyl) propionate]; a bis to tetrakis(t-butylohenol) having a heterocyclic group and a $C_{2-10}$alkylenecarbonyloxy group, exemplified by 3,9-bis[2-{3-(3-t-butyl-4-hydroxy-5-methylphenyl)propionyloxy}-1,1-dimethylethyl]-2,4,8,10-tetraoxaspiro[5.5]undecane; a t-alkylphenol (e.g., t-butylphenol, t-pentylphenol) having a $C_{3-10}$alkenylcarbonyloxy group, exemplified by 2-t-butyl-6-(3'-t-butyl-5'-methyl-2'-hydroxybenzyl)-4-methylphenylacrylate and 2-[1-(2-hydroxy-3,5-di-t-pentylphenyl)ethyl]-4,6-di-t-pentylphenylacrylate; a hindered phenolic compound having a phosphonic ester group, exemplified by di-n-octadecyl-3,5-di-t-butyl-4-hydroxybenzylphosphonate; a hindered phenolic compound having an amide group, exemplified by N,N'-hexamethylenebis(3,5-di-t-butyl-4-hydroxydihydrocinnamamide)], and others. Among them, a phenolic compound having a t-butyl group (particularly, a plurality of t-butyl groups), in particular, a compound having a plurality of t-butylphenol sites, is preferred. Particularly, a bis to tetrakis(mono to tetra t-butylphenol) in which t-butylphenol groups are connected or bonded to each other through the polyol ester of the fatty acid, in particular, a bis to tetrakis (mono or di t-butylphenol) in which t-butylphenol groups are connected or bonded to each other through a di- to tetra-ol ester group of a $C_{2-10}$fatty acid (particularly, a $C_{2-6}$fatty acid) is preferred.

The hindered phenol-series compound can be used either singly or in combination.

Weather (Light)-resistant Stabilizer

The weather (light)-resistant stabilizer is exemplified by (a) a benzotriazole-series compound, (b) a benzophenone-series compound, (c) an aromatic benzoate-series compound, (d) a cyanoacrylate-series compound, (e) an oxalic anilide-series compound, and (f) a hindered amine-series compound.

The benzotriazole-series compound (a) includes a benzotriazole having a hydroxyl group, and an aryl group substituted with an alkyl ($C_{1-6}$alkyl) group, such as 2-(2'-hydroxy-5'-methylphenyl)benzotriazole, 2-(2'-hydroxy-3',5'-di-t-butylphenyl)benzotriazole, 2-(2'-hydroxy-3',5'-di-t-amylphenyl)benzotriazole and 2-(2'-hydroxy-3',5'-di-isoamylphenyl)benzotriazole; a benzotriazole having a hydroxyl group, and an aryl group substituted with an aralkyl (or aryl) group, such as 2-[2'-hydroxy-3',5'-bis(α,α-dimethylbenzyl)phenyl]benzotriazole; a benzotriazole having a hydroxyl group, and an aryl group substituted with alkoxy ($C_{1-12}$alkoxy) group, such as 2-(2'-hydroxy-4'-octoxyphenyl)benzotriazole; and others. The preferred benzotriazole-series compound includes a benzotriazole having a hydroxyl group, and a $C_{6-10}$aryl (particularly, phenyl) group substituted with a $C_{3-6}$alkyl group, as well as a benzotriazole having a hydroxyl group, and an aryl group substituted with $C_{6-10}$aryl-$C_{1-6}$alkyl (particularly, phenyl-$C_{1-4}$alkyl) group.

Exemplified as the benzophenone-series compound (b) is a benzophenone having a plurality of hydroxyl groups (e.g., a di to tetrahydroxybenzophenone such as 2,4-dihydroxybenzophenone; a benzophenone having a hydroxyl group, and an aryl or aralkyl group substituted with a hydroxyl group, such as 2-hydroxy-4-oxybenzylbenzophenone); a benzophenone having a hydroxyl group and an alkoxy ($C_{1-16}$alkoxy) group (e.g., 2-hydroxy-4-methoxybenzophenone, 2-hydroxy-4-octoxybenzophenone, 2-hydroxy-4-dodecyloxy-benzophenone, 2,2'-dihydroxy-4-methoxybenzophenone, 2,2'-dihydroxy-4,4'-dimethoxybenzophenone and 2-hydroxy-4-methoxy-5-sulfobenzophenone); and others. The preferred benzophenone-series compound includes a benzophenone having a hydroxyl group, and a $C_{6-10}$aryl (or $C_{6-10}$aryl-$C_{1-4}$alkyl) group substituted with a hydroxyl group, particularly one having a hydroxyl group, and a phenyl-$C_{1-2}$alkyl group substituted with a hydroxyl group.

The aromatic benzoate-series compound (c) includes an alkylphenylsalicylate such as p-t-butylphenylsalicylate and p-octylphenylsalicylate.

Exemplified as the cyanoacrylate-series compound (d) is a cyano group-containing diphenylacrylate such as 2-ethylhexyl-2-cyano-3,3-diphenylacrylate and ethyl-2-cyano-3,3-diphenylacrylate.

The oxalic anilide-series compound (e) is exemplified by an oxalic diamide having a phenyl group on a nitrogen atom in which the phenyl group may have a substituent(s), exemplified by N-(2-ethylphenyl)-N'-(2-ethoxy-5-t-butylphenyl) oxalic diamide, N-(2-ethylphenyl)-N'-(2-ethoxy-phenyl) oxalic diamide.

The hindered amine-series compound (f) includes a piperidine derivative having a steric hindrance group, for example, an ester group-containing piperidine derivative [an aliphatic acyloxypiperidine (e.g., a $C_{2-20}$aliphatic acyloxy-tetramethylpiperidine) such as 4-acetoxy-2,2,6,6-tetramethylpiperidine, 4-stearoyloxy-2,2,6,6-tetramethylpiperidine and 4-acryloyloxy-2,2,6,6-tetramethylpiperidine; an aromatic acyloxypiperidine (e.g., a $C_{7-11}$aromatic acyloxy-tetramethylpiperidine) such as 4-benzoyloxy-2,2,6,6-tetramethylpiperidine; an aliphatic di or tricarboxylic acid-bis or trispiperidyl ester (e.g., a $C_{2-20}$aliphatic dicarboxylic acid-bispiperidyl ester) such as bis(2,2,6,6-tetramethyl-4-piperidyl)oxalate, bis(2,2,6,6,-tetramethyl-4-piperidyl)malonate, bis(2,2,6,6-tetramethyl-4-piperidyl)adipate, bis(1,2,2,6,6-pentamethyl-4-piperidyl) adipate, bis(2,2,6,6-tetramethyl-4-piperidyl)sebacate and bis (1,2,2,6,6-pentamethyl-4-piperidyl)sebacate; an aromatic di to tetracarboxylic acid-bis to tetrakispiperidyl ester (e.g., an aromatic di or tricarboxylic acid-bis or trispiperidyl ester) such as bis(2,2,6,6-tetramethyl-4-piperidyl)terephthalate and tris(2,2,6,6-tetramethyl-4-piperidyl)benzene-1,3,5-tricarboxylate; and others], an ether group-containing piperidine derivative [a $C_{1-10}$alkoxypiperidine (e.g., a $C_{1-6}$alkoxy-tetramethylpiperidine) such as 4-methoxy-2,2,6, 6-tetramethylpiperidine; a $C_{5-8}$cycloalkyloxy-piperidine such as 4-cyclohexyloxy-2,2,6,6,-tetramethylpiperidine; an aryloxypiperidine such as 4-phenoxy-2,2,6,6-tetramethylpiperidine; a $C_{6-10}$aryl-$C_{1-4}$alkyloxy-piperidine such as 4-benzyloxy-2,2,6,6-tetramethylpiperidine; an alkylenedioxybispiperidine (e.g., a $C_{1-10}$alkylenedioxy-bispiperidine) such as 1,2-bis(2,2,6,6-tetramethyl-4-piperidyloxy)ethane; and others], an amide group-containing piperidine derivative [a carbamoyloxypiperidine such as 4-(phenylcarbamoyloxy)-2,2,6,6-tetramethylpiperidine; an alkylenedioxy-bis piperidine substituted with a carbamoyloxy group, for example, bis(2,2,6, 6-tetramethyl-4-piperidyl)hexamethylene-1,6-dicarbamate; and others]. Moreover, the hindered amine-series compound also includes a polycondensate of piperidine derivatives of high molecular weight [e.g., polycondensate of dimethyl succinate and 1-(2-hydroxyethyl)-4-hydroxy-2,2,6,6-tetramethylpiperidine].

The preferred hindered amine-series compound includes the ester group-containing piperidine derivative, particularly, an aliphatic carboxylic acid-piperidyl ester (e.g., preferably a $C_{2-16}$aliphatic dicarboxylic acid-bispiperidyl ester, and more preferably a $C_{6-14}$aliphatic dicarboxylic acid-bistetramethylpiperidyl ester), as well as an aromatic di or tricarboxylic acid-bis or trispiperidyl ester.

The weather (light)-resistant stabilizer may be used singly, or may be used in combination with the same or different compounds. It is preferred that the hindered amine-series compound (f) and at least one member selected from the other weather (light)-resistant stabilizers are used in combination. Particularly, it is preferred to use both the benzotriazole-series compound and the hindered amine-series compound. In this case, a ratio of the hindered amine-series compound relative to the benzotriazole-series compound (weight ratio) is about 0/100 to 80/20, preferably about 10/90 to 70/30, and more preferably about 20/80 to 60/40.

Spiro-compound Having a Triazine Ring

The spiro-compound having a triazine ring need only be a compound which has a triazine ring at its side chain. There is no particular limitation on the number of the triazine ring. The preferred number of the triazine ring is about 1 to 4, preferably about 1 to 2 (particularly, 2). In particular, the preferred compound is one in which two triazine rings are connected or bonded to each other through a spiro-compound (that is, a compound which has two triazine rings as the end groups of a spiro-compound).

The triazine ring includes 1,2,3-triazine, 1,2,4-triazine and 1,3,5-triazine. Among them, 1,3,5-triazine is preferred. Moreover, the triazine ring may have a substituent(s) such as an alkyl (e.g., a $C_{1-4}$alkyl), an aryl, an amino or a substituted amino group. As the triazine ring, 1,3,5-triazine ring having the amino group or the substituted amino group, particularly, guanamine ring, is preferred.

Although a spiro ring part may be a spiro ring composed of only carbon atoms, a spiro ring containing a hetero atom(s) (particularly, oxygen atom) as a constitutive atom of the ring is preferred. Such a spiro-compound includes a spiro-compound having two guanamine rings as its end groups, represented by the following formula (1):

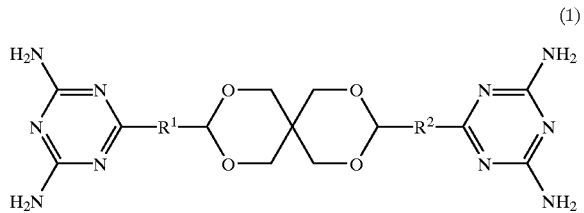

(1)

wherein $R^1$ and $R^2$ are the same or different, each representing an alkylene group, an arylene group, or an aralkylene group.

In the above-mentioned formula (1), the alkylene group represented by the groups $R^1$ and $R^2$ includes a straight or branched $C_{1-10}$alkylene group exemplified by methylene, ethylene, propylene, isopropylene, butylene and isobutylene group. The arylene group includes a $C_{6-10}$arylene group such as phenylene and naphthylene group. The aralkylene group includes a group connected or bonded to the alkylene group with the arylene group. The preferred the groups $R^1$ and $R^2$ are the alkylene group (e.g., a $C_{1-6}$alkylene group), particularly a $C_{1-3}$alkylene group (such as ethylene group), and others. Moreover, the groups $R^1$ and $R^2$ may have a further substituent(s), for example, a $C_{1-4}$alkyl group such as methyl group, phenyl group, amino group, an N-substituted amino group.

Exemplified as such a spiro-compound is a 3,9-bis[(3,5-diamino-2,4,6-triazaphenyl)$C_{1-6}$alkyl]-2,4,8,10-tetraoxaspiro[5.5]undecane such as 3,9-bis[2-(3,5-diamino-2,4,6-triazaphenyl)ethyl]-2,4,8,10-tetraoxaspiro[5.5]undecane (CTU guanamine), 3,9-bis[1-(3,5-diamino-2,4,6-triazaphenyl)methyl]-2,4,8,10-tetraoxaspiro[5.5]undecane (CMTU guanamine), 3,9-bis[2-(3,5-diamino-2,4,6-triazaphenyl)-2-methylethyl]-2,4,8,10-tetraoxaspiro[5.5]undecane, 3,9-bis[1-(3,5-diamino-2,4,6-triazaphenyl)-1,1-dimethylmethyl]-2,4,8,10-tetraoxaspiro[5.5]undecane, 3,9-bis[3-(3,5-diamino-2,4,6-triazaphenyl)-1,1-dimethylpropyl]-2,4,8,10-tetraoxaspiro[5.5]undecane and 3,9-bis[3-(3,5-diamino-2,4,6-triazaphenyl)-2,2-dimethylpropyl]-2,4,8,10-tetraoxaspiro[5.5]undecane. Among the spiro-compounds, a 3,9-bis[(3,5-diamino-2,4,6-triazaphenyl)straight or branched $C_{1-5}$alkyl]-2,4,8,10-tetraoxaspiro[5.5]undecane, for example, CTU guanamine, CMTU guanamine, 3,9-bis[3-(3,5-diamino-2,4,6-triazaphenyl)-1,1-dimethylpropyl]-2,4,8,10-tetraoxaspiro[5.5]undecane is preferred. Particularly, CTU guanamine is preferred.

The spiro-compound may be a compound containing water of crystallization or a (crystalline) hydrate, or an anhydrous compound. From the viewpoint of a dispersivility of the spiro-compound in the polyacetal resin, the spiro compound containing water of crystallization is particularly used preferably. Usually, the spiro-compound comprises 0.1 to 3 molecular of water of crystallization relative to 1 molecular of the spiro-compound.

Such a spiro-compound can be produced or manufactured by a process of reacting a dinitrile having a tetraoxaspiro ring with dicyandiamide in the presence of a basic catalyst in an alcohol-series organic solvent under high pressure (Japanese Patent Application Laid-Open No. 32664/1993 (JP-5-32664A)), by a process of reacting in the presence of a basic catalyst in an ether-series organic solvent (Japanese Patent Publication No. 8676/1969 (JP-44-8676B)), and by other process.

In such a reaction of the dinitrile having the tetraoxaspiro ring with the dicyandiamide, a spiro-compound having a nitrile group as its one end group and a guanamine ring as another end group can be also produced. The spiro-compound having a nitrile group as its one end group and a guanamine ring as another end group includes a 3-(cyanoalkyl)-9-[(3,5-diamino-2,4,6-triazaphenyl)alkyl]-2, 4,8,10-tetraoxaspiro[5.5]undecane [for example, 3-(cyano$C_{1-6}$alkyl)-9-[(3,5-diamino-2,4,6-triazaphenyl)$C_{1-6}$alkyl]-2,4,8,10-tetraoxaspiro[5.5]undecane such as 3-(2-cyanoethyl)-9-[2-(3,5-diamino-2,4,6-triazaphenyl)ethyl]-2, 4,8,10-tetraoxaspiro[5.5]undecane (CTU monoguanamine), 3-(1-cyanomethyl)-9-[1-(3,5-diamino-2,4,6-triazaphenyl) methyl]-2,4,8,10-tetraoxaspiro[5.5]undecane (CMTU monoguanamine), 3-(2-cyano-2-methylethyl)-9-[2-(3,5-diamino-2,4,6-triazaphenyl)-2-methylethyl]-2,4,8,10-tetraoxaspiro[5.5]undecane, 3-(1-cyano-1,1-dimethylmethyl)-9-[3-(3,5-diamino-2,4,6-triazaphenyl)-1, 1-dimethylmethyl]-2,4,8,10-tetraoxaspiro[5.5]undecane, 3-(3-cyano-2,2-dimethylpropyl)-9-[3-(3,5-diamino-2,4,6-triazaphenyl)-2,2-dimethylpropyl]-2,4,8,10-tetraoxaspiro [5.5]undecane and 3-(3-cyano-1,1-dimethylpropyl)-9-[3-(3, 5-diamino-2,4,6-triazaphenyl)-1,1-dimethylpropyl]-2,4,8, 10-tetraoxaspiro[5.5]undecane]. Among of these spiro-compounds, a 3-(cyano straight or branched $C_{1-5}$alkyl)-9-[(3,5-diamino-2,4,6-triazaphenyl)straight or branched $C_{1-5}$alkyl]-2,4,8,10-tetraoxaspiro[5.5]undecane, for example, CTU monoguanamine, CMTU monoguanamine and 3-(3-cyano-1,1-dimethylpropyl)-9-[3-(3,5-diamino-2,4, 6-triazaphenyl)-1,1-dimethylpropyl]-2,4,8,10-tetraoxaspiro [5.5]undecane is preferred, and particularly CTU monoguanamine is preferred.

Also, the spiro-compound of the present invention includes the spiro-compound having a triazine ring (such as guanamine ring) as its one end group, as well as a mixture of the spiro-compound having a triazine ring as its one end group and a spiro-compound having two triazine rings (such as guanamine rings) as its both end groups.

Among them, the spiro-compound comprising at least a spiro-compound having two guanamine rings as its end groups is preferred. For example, the spiro-compound may be one which comprises a 3,9-bis[(3,5-diamino-2,4,6-triazaphenyl)alkyl]-2,4,8,10-tetraoxaspiro[5.5]undecane and a 3-(cyanoalkyl)-9-[(3,5-diamino-2,4,6-triazaphenyl) alkyl]-2,4,8,10-tetraoxaspiro[5.5]undecane, in particular, one which comprises a 3,9-bis[(3,5-diamino-2,4,6-triazaphenyl)$C_{1-6}$alkyl]-2,4,8,10-tetraoxaspiro[5.5] undecane and a 3-(cyano$C_{1-6}$alkyl)-9-[(3,5-diamino-2,4,6-triazaphenyl)$C_{1-6}$alkyl]-2,4,8,10-tetraoxaspiro[5.5] undecane.

Ratio or Proportion of Each Component

In the resin composition of the present invention, the ratio or proportion of the hindered phenol-series compound is, relative to 100 parts by weight of the polyacetal resin, about 0.001 to 5 parts by weight, preferably about 0.005 to 3 parts by weight, and more preferably about 0.01 to 1 part by weight.

The ratio or proportion of the weather (light)-resistant stabilizer is, relative to 100 parts by weight of the polyacetal resin, about 0.01 to 5 parts by weight (e.g., about 0.01 to 3 parts by weight), preferably about 0.01 to 2 parts by weight, and more preferably about 0.1 to 2 parts by weight (e.g., about 0.1 to 1.5 parts by weight).

The ratio or proportion of the spiro-compound is, relative to 100 parts by weight of the polyacetal resin, about 0.001 to 10 parts by weight, preferably about 0.01 to 5 parts by weight, and more preferably about 0.03 to 1 part by weight.

Moreover, in the resin composition of the present invention, the ratio of the weather (light)-resistant stabilizer relative to the spiro-compound (weight ratio) is about 0.01/1 to 30/1, preferably about 0.1/1 to 10/1, and more preferably about 0.3/1 to 3/1.

Coloring Agent

Moreover, the polyacetal resin composition of the present invention may further comprise a coloring agent. The coloring agent includes various dyes or pigments. As the dye, a solvent dye is preferred, and includes an azo-series dye, an anthraquinone-series dye, a phthalocyanine-series dye and a naphthoquinone-series dye. The pigment can be used an inorganic pigment or an organic pigment.

Exemplified as the inorganic pigment is a titanium-series (titanium-containing) pigment, a zinc-series (zinc-containing) pigment, a carbon black (e.g., a furnace black, a channel black, an acetylene black, Ketjen black), an iron-series (iron-containing) pigment, a molybdenum-series (molybdenum-containing) pigment, a cadmium-series (cadmium-containing) pigment, a lead-series (lead-containing) pigment, a cobalt-series (cobalt-containing) pigment and an aluminum-series (aluminum-containing) pigment.

The organic pigment is exemplified by an azo-series pigment, an anthraquinone-series pigment, a phthalocyanine-series pigment, a quinacridone-series pigment, a perylene-series pigment, a perinone-series pigment, an isoindoline-series pigment, a dioxazine-series pigment or a threne-series pigment.

The above-mentioned coloring agent may be used singly, or in combination with a plurality of coloring agents. By using a coloring agent having a high light-shielding effect [such as a carbon black, a titanium white (a titanium oxide), a phthalocyanine-series pigment, particularly a carbon black], a weather (light)-resistance of the polyacetal resin composition can be improved.

The content of the coloring agent is, for example, relative to 100 parts by weight of the polyacetal resin, about 0 to 5 parts by weight (e.g., about 0.01 to 5 parts by weight), preferably about 0.1 to 4 parts by weight, and more preferably about 0.1 to 2 parts by weight.

Moreover, to the resin composition of the present invention may be further added an additive(s) such as a processing stabilizer or a heat stabilizer in order to improve the moldability or the heat resistance.

Processing Stabilizer

The processing stabilizer includes at least one member selected from (a) a long-chain or higher fatty acid or a derivative thereof, (b) a polyoxyalkylene glycol, (c) a silicone compound, and others.

(a) Long-chain or Higher Fatty Acid or Derivative Thereof

The long-chain fatty acid or a derivative thereof may be a saturated fatty acid or an unsaturated fatty acid. Moreover, a part of hydrogen atoms in the long-chain fatty acid may be substituted with a substituent(s) such as hydroxyl group. Such a long-chain fatty acid is exemplified by a mono- or di-carboxylic fatty acid having not less than 10 carbon atoms, for example, a saturated mono-carboxylic fatty acid having not less than 10 carbon atoms [e.g., a saturated $C_{10-34}$ fatty acid (preferably a saturated $C_{10-26}$ fatty acid) such as capric acid, lauric acid, myristic acid, pentadecylic acid, palmitic acid, stearic acid, arachic acid, behenic acid and montanic acid], an unsaturated mono-carboxylic fatty acid having not less than 10 carbon atoms [e.g., an unsaturated $C_{10-34}$ fatty acid (preferably an unsaturated $C_{10-26}$ fatty acid) such as oleic acid, linoleic acid, linolenic acid, arachidonic acid and erucic acid], a di-carboxylic fatty acid having not less than 10 carbon atoms (a dibasic fatty acid) [e.g., a saturated di-carboxylic $C_{10-30}$ fatty acid (preferably a saturated di-carboxylic $C_{10-20}$ fatty acid) such as sebacic acid, dodecanoic diacid, tetradecanoic diacid and thapsiaic acid (thapsic acid); as well as an unsaturated di-carboxylic $C_{10-30}$ fatty acid (preferably an unsaturated di-carboxylic $C_{10-20}$ fatty acid) such as decenoic diacid and dodecenoic diacid]. The fatty acid can be used singly or in combination. The fatty acid also includes one which has one or a plurality of hydroxyl group(s) in the molecular (e.g., a hydroxy-saturated $C_{10-26}$ fatty acid such as 12-hydroxy stearic acid).

The derivative of the long-chain fatty acid includes a fatty acid ester, a fatty acid amide, and others. As to the long-chain fatty acid ester, there is no particular limitation on its structure, and either of a straight or branched chain fatty acid ester can be used. As the long-chain fatty acid ester, there may be mentioned, for example, an ester of the above-mentioned long-chain fatty acid with an alcohol (e.g., an ester having one or a plurality of ester bond(s), such as a monoester, a diester, a triester and a tetraester). There is no particular limitation on a species of the alcohol constituting the long-chain fatty acid, and the preferred alcohol is a polyhydric alcohol. The polyhydric alcohol includes a polyhydric alcohol having about 2 to 8 carbon atoms (preferably, about 2 to 6 carbon atoms) or a polymer thereof, for example, a diol exemplified by an alkylene glycol [e.g., a $C_{2-8}$alkylene glycol (preferably a $C_{2-6}$alkylene glycol) such as ethylene glycol, diethylene glycol and propylene glycol]; a triol exemplified by glycerin, trimethylolpropane, or a derivative thereof; a tetraol exemplified by pentaerythritol, sorbitan, or a derivative thereof; as well as a homo- or copolymer of the polyhydric alcohol(s) [e.g., a homo- or copolymer of polyoxyalkylene glycol such as polyethylene glycol and polypropylene glycol, polyglycerin, dipentaerythritol, and polypentaerythritol]. The average degree of polymerization of the polyalkylene glycol is not less than 2 (e.g., about 2 to 500), preferably about 2 to 400 (e.g., about 2 to 300), and the preferred average degree of polymerization is not less than 16 (e.g., about 20 to 200). Such a polyalkylene glycol is preferably used on esterification with a fatty acid having 12 or more carbon atoms. The preferred polyhydric alcohol is a polyalkylene glycol having the average degree of polymerization of not less than 2. The polyhydric alcohol can be used singly or in combination.

Exemplified as such an ester of a long-chain fatty acid is ethylene glycol ester of distearic acid, glycerin ester of monostearic acid, glycerin ester of tripalmitic acid, polyglycerin ester of tristearic acid, trimethylolpropane ester of monopalmitic acid, pentaerythritol ester of monoundecylic acid, sorbitan ester of monostearic acid, as well as monolaurate, monopalmitate, monostearate, monobehenate, monomontanate, dilaurate, dipalmitate, distearate, dibehenate, dimontanate, dioleate and dilinolate, of polyalkylene glycol (such as polyethylene glycol and polypropylene glycol).

The fatty acid amide to be used includes an acid amide (e.g., monoamide and bisamide) of the long-chain fatty acid (a mono- or di-carboxylic long-chain fatty acid) with an amine such as a monoamine, a diamine and a polyamine. As the monoamide, there may be mentioned, for example, a primary acid amide of a saturated fatty acid (such as capric acid amide, lauric acid amide, myristic acid amide, palmitic acid amide, stearic acid amide, arachic acid amide, behenic acid amide and montanic acid amide); a primary acid amide of an unsaturated fatty acid (such as oleic acid amide); and a secondary acid amide of a saturated and/or an unsaturated fatty acid with a monoamine (such as stearyl stearic acid amide and stearyl oleic acid amide). The preferred fatty acid amide is a bisamide. The bisamide includes a bisamide of the fatty acid with a $C_{1-6}$alkylenediamine (particularly, $C_{1-2}$alkylenediamine), concretely such as ethylenediamine-distearic acid amide (ethylenebisstearylamide), ethylenediamine-dibehenic acid amide, ethylenediamine-dimontanic acid amide, hexamethylenediamine-distearic acid amide, ethylenediamine-dioleic acid amide and ethylenediamine-dierucic acid amide. Furthermore, a bisamide in which a different species of acyl group are bonded to amine sites of an alkylenediamine, respectively, such as ethylenediamine-(stearic acid amide)oleic acid amide, can also be used. In the acid amide, it is preferred that the fatty acid comprised in the acid amide is a saturated fatty acid.

The long-chain fatty acid or a derivative thereof can be used singly or in combination.

(b) Polyoxyalkylene Glycol

Exemplified as the polyoxyalkylene glycol is a homopolymer of an alkylene glycol [e.g., a $C_{2-6}$alkylene glycol (preferably a $C_{2-4}$alkylene glycol) such as ethylene glycol, propylene glycol and tetramethylene glycol], a copolymer thereof, and a derivative of the homopolymer or the copolymer. Specifically, the polyoxyalkylene glycol includes a poly$C_{2-6}$oxyalkylene glycol (preferably a poly$C_{2-4}$oxyalkylene glycol) such as polyethylene glycol, polypropylene glycol and polytetramethylene glycol; as well as a copolymer such as polyoxyethylene-polyoxypropylene copolymer (e.g., a random or block copolymer), polyoxyethylenepolyoxypropylene glyceryl ether and polyoxyethylenepolyoxypropylene monobutyl ether. The preferred polyoxyalkylene glycol includes a polymer having an oxyethylene unit, for example, polyethylene glycol, polyoxyethylenepolyoxypropylene copolymer, and a derivative thereof. Moreover, the number average molecular weight of the polyoxyalkylene glycol is about $1 \times 10^3$ to $1 \times 10^6$ (e.g., about $1 \times 10^3$ to $5 \times 10^5$), and preferably about $2 \times 10^3$ to $1 \times 10^5$ (e.g., about $2 \times 10^3$ to $5 \times 10^4$).

The polyoxyalkylene glycol can be used singly or in combination.

(c) Silicone Compound

Exemplified as the silicone-series compound is a polyorganosiloxane. The polyorganosiloxane includes a homopolymer of a dialkylsiloxane (e.g., dimethylsiloxane), an alkylarylsiloxane (e.g., methylphenylsiloxane), a diarylsiloxane (e.g., diphenylsiloxane), etc., for example, polydimethylsiloxane, polyphenylmethylsiloxane, and a copolymer thereof. The polyorganosiloxane may be an oligomer. Moreover, as the polyorganosiloxane, there may be also mentioned a modified polyorganosiloxane having such a substituent as epoxy, hydroxy, alkoxy, carboxy, amino or a substituted amino group (such as dialkylamino group), or ether, vinyl, (meth)acryloyl group at an end or in the main chain of the molecule (e.g., modified silicone). The silicone-series compound can be used singly or in combination.

The ratio or proportion of the above-mentioned processing stabilizer is, relative to 100 parts by weight of the polyacetal resin, about 0.01 to 10 parts by weight, preferably about 0.03 to 5 parts by weight (e.g., about 0.05 to 3 parts by weight), and particularly about 0.05 to 2 parts by weight.

Heat Stabilizer

The heat stabilizer includes (a) a basic nitrogen-containing compound, (b) a phosphine compound, (c) a metal salt of an organic carboxylic acid, (d) an alkaline or alkaline earth metal compound, (e) hydrotalcite, and (f) zeolite.

(a) Basic Nitrogen-containing Compound

The basic nitrogen-containing compound mentioned above may be a low molecular compound or a high molecular compound (nitrogen-containing resin).

The nitrogen-containing low molecular weight compound includes, for example, an aliphatic amine (such as monoethanolamine, diethanolamine, etc.), an aromatic amine (e.g., an aromatic secondary or tertiary amine such as o-toluidine, p-toluidine, p-phenylenediamine, etc.), an amide compound (a polycarboxylic acid amide, e.g. malonamide, isophthaldiamide, etc., p-aminobenzamide, etc.), ahydrazine or a derivative thereof (e.g. a hydrazine, a hydrazone, and a hydrazide such as a polycarboxylic acid hydrazide, etc.), a polyaminotriazine [e.g. a guanamine , or derivative thereof, such as guanamine, acetoguanamine, benzoguanamine, succinoguanamine, adipoguanamine, 1,3, 6-tris(3,5-diamino-2,4,6-triazinyl)-hexane and phthaloguanamine, melamine or a derivative thereof (a melamine; a condensate of melamine, such as melam, melem, mellon, etc.)], uracil or a derivative thereof (e.g. uracil, uridine, etc.), and cytosine and a derivative thereof (e.g. cytosine, cytidine, etc.), a guanidine or a derivative thereof (e.g., a non-cyclic guanidine such as guanidine and cyanoguanidine; a cyclic guanidine such as creatinine), a urea or a derivative thereof [e.g., biuret, biurea, ethylene urea, acetylene urea, isobutylidene diurea, crotylidene diurea, a condensate of urea with formaldehyde, hydantoin, a substituted hydantoin derivative (e.g., a mono or di$C_{1-4}$alkyl-substituted compound such as 1-methylhydantoin, 5-propylhydantoin and 5,5-dimethylhydantoin; an aryl-substituted compound such as 5-phenylhydantoin and 5,5-diphenylhydantoin; and an alkylaryl-substituted compound such as 5-methyl-5-phenylhydantoin), allantoin, a substituted allantoin derivative (e.g., a mono, di or tri$C_{1-4}$alkyl-substituted compound, and an aryl-substituted compound), a metal salt of allantoin (e.g., a salt with a metal element of the Group 3B of the Periodic Table of Elements, such as allantoin dihydroxyaluminium, allantoin monohydroxyaluminium and allantoin aluminium), a reaction product of allantion with an aldehyde compound (e.g., an adduct of allantoin and formaldehyde), a compound of allantoin with an imidazole compound (e.g., allantoin sodium dl-pyrrolidonecarboxylate), an organic acid salt, and others].

The nitrogen-containing resin includes, for example, an amino resin obtainable from a reaction with formaldehyde (a condensation resin such as a guanamine resin, a melamine resin and a guanidine resin, and a co-condensation resin such as a phenol-melamine resin, a benzoguanamine-melamine resin and an aromatic polyamine-melamine resin), an aromatic amine-formaldehyde resin (aniline resin etc.), a polyamide resin (e.g., a homo- or copolymerized polyamide such as nylon 3 (polyβ-alanine), nylon 46, nylon 6, nylon 66, nylon 11, nylon 12, nylon MXD6, nylon 6-10, nylon 6-11, nylon 6-12, nylon 6-66-610, etc., a substituted polyamide containing a methylol or alkoxymethyl group, etc.), a polyesteramide, a polyamideimide, a polyurethane, a polyacrylamide, a poly(N-vinylcarboxylic acid amide), a copolymer of N-vinylcarboxylic acid amide with other vinyl monomer, and others.

The basic nitrogen-containing compound can be used independently or in combination.

The preferred nitrogen-containing compound includes a guanamine (e.g., adipoguanamine), melamine or a derivative thereof [particularly, melamine or a melamine condensate (such as melam and melem)], a guanidine derivative (such as cyanoguanidine and creatinine), a urea derivative [e.g., biurea, a condensate of urea with formaldehyde, allantoin, and a metal salt of allantoin (such as allantoin dihydroxyaluminium)], a nitrogen-containing resin [e.g., an amino resin (an amino resin such as a melamine resin and a melamine-formaldehyde resin; a crosslinked amino resin such as a crosslinked melamine resin), and a polyamide resin].

(b) Phosphine Compound

As a phosphine compound, there may be mentioned an alkylphosphine (e.g., a $triC_{1-10}$alkylphosphine such as triethylphosphine, tripropylphosphine and tributylphosphine), a cycloalkylphosphine (e.g., a $triC_{5-12}$cycloalkylphosphine such as tricyclohexylphosphine), an arylphosphine (e.g., a $triC_{6-12}$arylphosphine such as triphenylphosphine, p-tolyldiphenylphosphine, di-p-tolylphenylphosphine, tri-m-aminophenylphosphine, tri-2,4-dimethylphenylphosphine, tri-2,4,6-trimethylphenylphosphine, tri-o-tolylphosphine, tri-m-tolylphosphine and tri-p-tolylphosphine), an aralkylphosphine (e.g., a $triC_{6-12}arylC_{1-4}$alkylphosphine such as tri-o-anisylphosphine and tri-p-anisylphosphine), an arylalkenylphosphine (e.g., $diC_{6-12}aryl$ $C_{2-10}$alkenylphosphine such as diphenylvinylphosphine and allyldiphenylphosphine), an arylaralkylphosphine (e.g., a $diC_{6-12}arylC_{6-12}arylC_{1-4}$alkylphosphine such as p-anisyldiphenylphosphine, and a $C_{6-12}aryldiC_{6-12}$aralkylphosphine such as di-p-anisylphenylphosphine), an alkylarylaralkylphosphine (e.g., a $C_{1-10}alkylC_{6-12}aryl$ $C_{6-12}arylC_{1-4}$alkylphosphine such as methylphenyl-p-anisylphosphine), a bisphosphine [for example, a $bis(diC_{6-12}arylphosphino)C_{1-10}$alkane such as 1,4-bis (diphenylphosphino)butane]. The phosphine compound can be used singly or in combination.

(c) Metal Salt of Organic Carboxylic Acid

The metal salt of the organic carboxylic acid includes a salt of an organic carboxylic acid with a metal (e.g., an alkaline metal such as Na and K; an alkaline earth metal such as Mg and Ca; and a transition metal such as Zn).

The organic carboxylic acid mentioned above may be a compound of low molecular weight or a compound of high molecular weight. As the organic carboxylic acid, there may be used a saturated or unsaturated lower aliphatic carboxylic acid having not more than 10 carbon atoms, and a polymer of an unsaturated aliphatic carboxylic acid, in addition to a saturated or unsaturated long-chain aliphatic carboxylic acid exemplified in item of the long-chain fatty acid. Moreover, the aliphatic carboxylic acid may have a hydroxy group.

The saturated lower aliphatic carboxylic acid includes a saturated $C_{1-9}$monocarboxylic acid (e.g., acetic acid, propionic acid, butyric acid, isobutyric acid, valeric acid, isovaleric acid, pivalic acid, caproic acid, caprylic acid), a saturated $C_{2-9}$dicarboxylic acid (e.g., oxalic acid, malonic acid, succinic acid, glutaric acid, adipic acid, pimelic acid, cork acid, azelaic acid), and an oxy-acid thereof (e.g., glycolic acid, lactic acid, glyceric acid, hydroxybutyric acid, citric acid).

The unsaturated lower aliphatic carboxylic acid includes an unsaturated $C_{3-9}$monocarboxylic acid [e.g., (meth)acrylic acid, crotonic acid, isocrotonic acid], an unsaturated $C_{4-9}$dicarboxylic acid (e.g., maleic acid, fumaric acid), and an oxy-acid thereof (e.g., propiolic acid).

Moreover, exemplified as the polymer of the unsaturated aliphatic carboxylic acid is a copolymer of a polymerizable unsaturated carboxylic acid [an α,β-ethylene-type unsaturated carboxylic acid, for example, a polymerizable unsaturated monocarboxylic acid (such as (meth)acrylic acid), a polymerizable unsaturated polycarboxylic acid (such as itaconic acid, maleic acid, fumaric acid), an anhydride of the polycarboxylic acid, a monoester of the polycarboxylic acid (e.g., a $monoC_{1-10}$alkylester of the polycarboxylic acid such as monoethyl maleate), and others] with an olefin (e.g., an $\alpha$-$C^{2-10}$olefin such as ethylene, propylene).

The metal salt of the organic carboxylic acid can be used singly or in combination.

The preferred metal salt of the organic carboxylic acid is a salt of an organic carboxylic acid with an alkaline earth metal (e.g., calcium acetate, calcium citrate, calcium stearate, magnesium stearate and calcium 12-hydroxystearate), an ionomer resin (a resin in which at least a part of carboxyl groups contained in the copolymer of the polymerizable unsaturated polycarboxylic acid with the olefin is neutralized with an ion(s) of the above-mentioned metal), and others. The ionomer resin is, for example, commercially available as ACLYN (manufactured by Allied Signal Inc.), Himilan (manufactured by Du Pont-Mitsui Polychemicals Co., Ltd.), Surlyn (manufactured by Du Pont), and others.

(d) Alkaline or Alkaline Earth Metal Compound

The alkaline or alkaline earth metal compound includes an inorganic compound exemplified by a metal oxide (such as CaO, MgO), a metal hydroxide (such as $Ca(OH)_2$, $Mg(OH)_2$), and a salt of an inorganic acid with a metal [e.g., a salt of an inorganic acid (such as a salt of carbonic acid with a metal (such as $Na_2CO_3$, $K_2CO_3$, $CaCO_3$ and $MgCO_3$), aborate, aphosphate)]. Particularly, the metal oxide and the metal hydroxide are preferred. Among the compounds, the alkaline earth metal compound is preferred.

The alkaline or alkaline earth metal compound can be used singly or in combination.

(e) Hydrotalcite

As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

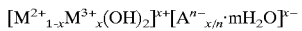

$$[M^{2+}_{1-x}M^{3+}_{x}(OH)_2]^{x+}[A^{n-}_{x/n}\cdot mH_2O]^{x-}$$

In the formula, $M^{2+}$ represents $Mg^{2+}$, $Mn^{2+}$, $Fe^{2+}$, $Co^{2+}$, or any of other divalent metal ions; $M^{3+}$ represents $Al^{3+}$, $Fe^{3+}$, $Cr^{3+}$, or any of other trivalent metal ions; $A^{n-}$ represents $CO_3^{2-}$, $OH^-$, $HPO_4^{2-}$, $SO_4^{2-}$, or any of other n-valent anions (particularly, monovalent or divalent anion); x is 0<x<0.5; and m is 0≦m<1.

The hydrotalcites can be used singly or in combination.

Incidentally, the hydrotalcite is available from Kyowa Chemical Industry Co., Ltd. under the trade name "DHT-4A", "DHT-4A-2", or "Alcamizer".

(f) Zeolite

Although there is no particular restriction as to the zeolite, those other than zeolite of the H-type, such as zeolite recited in Japanese Patent Application Laid-Open No. 62142/1995 (JP-7-62142A) [zeolites the smallest unit cell of which is a crystalline aluminosilicate with an alkaline and/or alkaline earth metal (A-, X-, Y-, L-, and ZSM-type zeolites, mordenite-type zeolite; chabazite, mordenite, faujasite, and other naturally-occurring zeolites)] can be employed.

The zeolites can be used singly or in combination.

Incidentally, A-type zeolite is available under the trade name "Zeolam A-3", "Zeolam A-4", or "Zeolam A-5", X-type zeolite under the trade name "Zeolam F-9", and Y-type zeolite under the trade name "HSZ-320NAA", from Tosoh Corp.

The heat stabilizers can be used singly or in combination. It is also possible to impart thermal stability to a polyacetal resin by using at least one member selected from the phosphine compound, the metal salt of the organic carboxylic acid, the alkaline or alkaline earth metal compound, the hydrotalcite and the zeolite in combination with the basic nitrogen-containing compound, even though the amount of the heat stabilizer to be added is small.

The ratio or proportion of the heat stabilizer can be selected within the range of about 0.001 to 10 parts by weight, preferably about 0.001 to 5 parts by weight (particularly, about 0.01 to 2 parts by weight), relative to 100 parts by weight of the polyacetal resin.

The processing stabilizer and the heat stabilizer can be used singly or in combination.

To the polyacetal resin composition of the present invention may be optionally added a conventional additive(s) singly or in combination. As the additive, there may be mentioned an antioxidant (e.g., an amine-series, a phosphorous-series, a sulfur-series, a hydroquinone-series, and a quinoline-series antioxidant), a mold-release agent, a nucleating agent, an antistatic agent, a slip- (friction/weak) improving agent, an impact resistance improver, a flame retardant, a surfactant, an antibacterial agent, an antifungal agent, an aromatic agent, a flavoring, various polymers (e.g., an olefinic resin, a polyester-series resin, a urethane-series resin), a filler [e.g., a fibrous filler (such as glass fiber, carbon fiber), a particulate or plate-like filler (such as glass bead, milled fiber, kaolin, talc, mica, glass flake)], and others. Moreover, if necessary, to the polyacetal resin composition may be added a resin having good weather (light)-resistant stability (stability for weather(ing) (light)-resistance), for example, an acrylic resin (a homo- or copolymer of a $C_{1-10}$alkyl(meth)acrylate such as polymethylmethacrylate), a acrylic core-shell polymer and a polycarbonate-series resin.

Production Process of Polyacetal Resin Composition

The polyacetal resin composition of the present invention may be a particulate mixture or a molten mixture, and it can be prepared by mixing a polyacetal resin with a hindered phenol-series compound, a weather (light)-resistant stabilizer and the above-mentioned spiro-compound, and if necessary, other additives in a conventional manner. For example, (1) a process comprising feeding each component from a main feeder, kneading and extruding the resulting mixture into pellets with a uniaxial or biaxial extruder, and molding the pellets, (2) a process comprising feeding every component except the spiro-compound from a main feeder, feeding the spiro-compound or the spiro-compound and the polyacetal resin from a side feeder, kneading and extruding the resulting mixture into pellets with a uniaxial or biaxial extruder, and molding the pellets, (3) once making pellets (master batch) different in composition, mixing (diluting) the pellets in a certain ratio, and molding the resulting pellets to give a shaped article having a certain composition, or (4) a process comprising applying an inhibitor (or suppressant) to a pelletized polyacetal resin by for example spraying, and molding the resulting pellets to give a shaped article having a certain composition is utilized. Moreover, in the preparation of a composition for use in a shaped article, mixing of a powdered polyacetal as a substrate (e.g., a powder obtained by grinding a part or all of the polyacetal resin) with other components (e.g., a hindered phenolic compound, a weather (light)-resistant stabilizer, a spiro-compound) followed melt-kneading improves the dispersion of the additives and therefore is advantageous.

The polyacetal resin composition of the present invention has excellent weather (light)-resistant stability (weather(ing) (light)-resistance) required in an environment or condition for using or keeping the composition after molding, and can be prolonged life of a product obtained from the composition. Additionally, in the molding and processing (particularly, a melt-molding and processing) step, the emission of formaldehyde due to oxidation or thermal decomposition of the polyacetal resin can be restrained or inhibited remarkably, and the working environment can be improved or ameliorated. Moreover, deposition of decomposition products or additives on the mold (mold deposit), blooming or bleeding of such products from a shaped article can be remarkably restricted or inhibited, and various problems on the molding and processing step can be improved. Therefore, the resin composition of the present invention is useful in fabricating a variety of shaped articles by such a conventional method as injection molding, extrusion molding, compression molding, blow molding, vacuum molding, foam molding, rotation molding, and gas injection molding.

Shaped Article

The polyacetal resin article of the present invention formed with the above-mentioned polyacetal resin composition comprises a hindered phenolic compound, a weather (light)-resistant stabilizer and a certain spiro-compound in combination, and has a good weather (light)-resistant stability with having extremely small amount of emission (or generation) of formaldehyde. In other words, shaped articles molded from the conventional polyacetal resins containing antioxidants and other stabilizers liberate relatively large amounts of formaldehyde, cause corrosion and discoloration, and contaminate the living and working environment. For example, the formaldehyde emission of commercial ordinary polyacetal resin articles is about 2 to 5 $\mu$g per $cm^2$ surface area under dry conditions (in a constant-temperature dry atmosphere) and about 3 to 6 $\mu$g per $cm^2$ surface area under humid conditions (in a constant-temperature moisture-laden atmosphere).

On the other hand, the formaldehyde emission of the polyacetal resin article of the present invention is not more than 1.5 $\mu$g (about 0 to 1 $\mu$g) per $cm^2$ surface area of the shaped article under dry conditions, preferably about 0 to 0.8 $\mu$g, more preferably about 0 to 0.7 $\mu$g, and usually about 0.01 to 0.7 $\mu$g. Moreover, in humid conditions, the formaldehyde emission is not more than 2.5 $\mu$g (about 0 to 2 $\mu$g) per $cm^2$ surface area of the shaped article, preferably about 0 to 1.7 $\mu$g, more preferably about 0 to 1.5 $\mu$g, and usually about 0.01 to 1.5 $\mu$g.

The shaped polyacetal resin article according to the present invention should show the above-mentioned formaldehyde emission under either dry conditions or humid conditions, but it generally does show the above emission level under both conditions.

The formaldehyde emission under dry conditions can be determined as follows.

After the shaped article of polyacetal resin is cut where necessary and its surface area is measured, a suitable portion of the article (e.g. the amount equivalent to a surface area of about 10 to 50 cm$^2$) is placed in a vessel (20 ml capacity) to seal and stand at a temperature of 80° C. for 24 hours. Then, this sealed vessel is charged with 5 ml of water and the formalin in the aqueous solution is assayed in accordance with JIS K0102, 29 (under the heading of Formaldehyde) to calculate the formaldehyde emission ($\mu$g/cm$^2$) per unit surface area of the shaped article.

The formaldehyde emission under humid conditions can be determined as follows.

After the shaped article of polyacetal resin is cut where necessary and its surface area is measured, a suitable portion of the shaped article (e.g. the amount equivalent to a surface area of about 10 to 100 cm) is suspended from the lid of a sealable vessel (1 L capacity) containing 50 ml of distilled water. After seal of the vessel, the vessel is allowed to stand in a constant temperature oven at 60° C. for 3 hours. Thereafter, the vessel is allowed to stand at room temperature for 1 hour and the formalin in the aqueous solution within the vessel is assayed in accordance with JIS K0102, 29 (under the heading of Formaldehyde) to calculate the formaldehyde emission per unit surface area ($\mu$g/cm$^2$) of the article.

The above quantitative limitation on formaldehyde emission in the present invention is valid not only for shaped articles available from polyacetal resin compositions comprising the polyacetal resin, the hindered phenol-series compound, the weather (light)-resistant stabilizer and the spiro-compound, with or without the conventional additives (conventional stabilizer, releasing agent, etc.), but also for shaped articles molded from comparable resin compositions containing an inorganic filler and/or other polymers, only if a major part of the surface of the article (for example, 50 to 100% of the total surface area) is constituted by polyacetal resin (for example, a multi-colored article or a coated article).

The shaped article according to the present invention finds application in any field of use where formaldehyde is objectionable (for example, knobs and levers for use as automotive parts) and can also be used advantageously as parts and members in a variety of fields inclusive of automotive parts, electrical and electronic component (driving component and driven component) parts, architectural members and pipeline installation parts, household and cosmetic product parts, and medical device (for diagnostic or therapeutic use) parts.

Specifically, the automotive parts include but are not limited to car interior parts such as the inner handle, fuel trunk opener, seat belt buckle, assist lap, switch, knob, lever, clip, etc., electrical system parts such as meters and connectors, electrical and electronic parts or mountings related to audio equipment and car navigation equipment, parts in contact with metals, typically the window regulator carrier plate, door lock actuator parts, mirror parts, wiper motor system parts, and fuel system parts.

The electrical or electronic component parts (the mechanical parts) includes, for example, parts or members constituted with polyacetal resin articles and fitted with a number of metal contacts [e.g. audio equipment such as the cassette tape recorder, video equipment such as the video tape recorder (VTR), 8 mm or other video camera, etc., office automation (OA) equipment such as the copying machine, facsimile, word processor, computer, etc., toys actuated by the driving force of an electric motor or a spring, a telephone, a keyboard as an accessory to a computer or the like]. To be specific, there can be mentioned the chassis, gear, lever, cam, pulley, and bearing. Furthermore, the invention is applicable to optical and magnetic recording medium parts at least partly made of molded polyacetal resin (e.g. metal thin-film magnetic tape cassette, magnetic disk cartridge, opticomagnetic disc cartridge, etc.) and more particularly, the metal tape cassette for musics, digital audio tape cassette, 8 mm video tape cassette, floppy disk cartridge, minidisk cartridge, etc. As specific optical and magnetic medium parts, there can be mentioned tape cassette parts (tape cassette body, reel, hub, guide, roller, stopper, lid, etc.) and disk cartridge parts (disk cartridge body (case), shutter, cramping plate, etc.).

In addition, the shaped article of polyacetal resin according to the invention can be used with advantage in architectural members and pipeline parts such as lighting equipment parts, interior architectural members (such as fittings, fixtures, furnishings), piping, cock, faucet, toilet-related parts, etc., a broad range of products related to daily living, cosmetic products, and medical devices, for example fastener (such as slide fastener, snap fastener, hoop-and-loop fastener, rail fastener), stationery, lipcream or lipstick cases, cleansing device, water cleaner, spray nozzle, spray device or container, aerosol container, general vessels, syringe holder, and so on.

INDUSTRIAL APPLICABILITY

Since the polyacetal resin composition of the present invention comprises a hindered phenol-series compound, a weather (light)-resistant stabilizer and a certain spiro-compound, it can be improved in weather (light)-resistant stability, particularly, greatly improved in degradation (or aging) caused by light after molding. Moreover, addition of a small amount of the above-mentioned components enables to suppress or inhibit formaldehyde emission from the polyacetal resin and an article thereof at extremely low level, and enables to improve excellently the circumferential environment (e.g., working environment and using environment). Furthermore, the polyacetal resin composition of the present invention can be inhibit emission of formaldehyde even under severe conditions to suppress: deposition of decomposition products on the mold (mold deposit); blooming or bleeding of such products from a shaped article; and thermal aging or deterioration of the article thus contributing, to upgrading of the quality and moldability of the shaped article.

EXAMPLES

The following examples are intended to describe this invention in further detail and should by no means be interpreted as defining the scope of the invention.

Incidentally, referring to the examples and comparative examples, moldability (the amount of the deposit on the mold), the amount of emission of formaldehyde from the molded (or shaped) articles under dry and humid (wet) conditions, as well as weather (light)-resistance of the shaped articles were evaluated by the following methods.

Moldability (The Amount of the Deposit on the Mold)

A pellet formed with a polyacetal resin composition was continuously or successively shaped or molded by using a injection molding machine (7,500 shots) to obtain a certain-shaped article (size: 20 mm×1 mm), and the degree of the deposition on the mold was evaluated and classified into five grades. Incidentally, the smaller the number of the grade is, the lower or smaller the amount of the deposit is, namely the lower or smaller the amount of the mold deposit is.

The Amount of Emission of Formaldehyde from the Molded Article in a Dry Environment Each resin sample consisting of 10 testpieces (2 mm×2 mm×50 mm; total surface area of about 40 cm$^3$) was placed in a vessel (capacity 20 ml) to seal and heat in a constant temperature oven at 80° C. for 24 hours. After air-cooling to room temperature, 5 ml of distilled water was injected into the container using a syringe. The formaldehyde content of this aqueous solution was determined in accordance with JIS K0102, 29 (under the heading of Formaldehyde) and the formaldehyde gas emission per surface area ($\mu g/cm^2$) was calculated.

The Amount of Emission of Formaldehyde from the Molded Article in a Humid Environment A plate testpiece (100 mm×40 mm×2 mm; total surface area 85.6 cm$^2$) was suspended from the stopper or lid of a polyethylene bottle (capacity 1 L) containing 50 ml of distilled water. The bottle was sealed to stand in a constant temperature oven at 60° C. for 3 hours, followed by standing for 1 hour at room temperature. The formalin content of the aqueous solution in the bottle was determined in accordance with JIS K0102, 29 (under the heading of Formaldehyde) and the formaldehyde gas emission per surface area of the article ($\mu g/cm^2$) was calculated.

Weather (Light)-resistance

A plate-molded article (70 mm×40 mm×3 mm) was subjected to an irradiation test with a weather meter [manufactured by Suga Test Instruments Co., Ltd., WEL-SUN-HCH type] for 600 hours in a fade condition at 83° C. The change of color and the change of gloss between before and after the irradiation were observed, then evaluated and classified into five grades, respectively. The smaller the number of the grade is, the smaller the degree of the change is, namely the smaller the deterioration of gloss and the degree of discoloration is.

Examples 1 to 40 and Comparative Examples 1 to 5

One hundred (100) parts by weight of polyacetal resin was mixed with a hindered phenol-series compound, a weather (light)-resistant stabilizer, a spiro-compound, a coloring agent, a processing stabilizer and a heat stabilizer in the proportions indicated in Tables 1 to 3 and each mixture was melt-extruded using a twin-screw extruder to prepare pelletized compositions. From the pellets, prescribed testpieces were fabricated with an injection molding machine, and the mold deposit on molding was evaluated. Moreover, the amount of emission of formaldehyde from each of prescribed testpieces was measured. Further, the weather (light)-resistant stability of the prescribed testpieces was evaluated. The results are shown in Tables 1 to 3.

For comparison, samples prepared without addition of the spiro-compound, without addition of the weather (light)-resistant stabilizer and with addition of large amount of the melamine were similarly evaluated. The results are shown in Table 4.

The polyacetal resin, the hindered phenol-series compound, the spiro-compound, the weather (light)-resistant stabilizer, the coloring agent, the processing stabilizer and the heat stabilizer used in the Examples and Comparative Examples are as follows.
1. Polyacetal Resin "a"
   (a-1): copolymer containing polyacetal resin as main component (a resin stabilized by a molten-hydrolysis method, melt index=9 g/10 minutes)
   (a-2): copolymer containing polyacetal resin as main component (a resin stabilized by a solution-hydrolysis method, melt index=9 g/10 minutes)
   Incidentally, the melt index is a value (g/10 minute) determined according to ASTM-D1238, and in the condition of using 2169 g of the resin at a temperature of 190° C.
2. Hindered Phenol-series compound "b"
   (b-1): triethylene glycol bis[3-(3-t-butyl-5-methyl-4-hydroxyphenyl)propionate]
   (b-2): pentaerythritol tetrakis[3-(3,5-di-t-butyl-4-hydroxyphenyl)propionate]
3. Spiro-compound "c"
   (c-1): CTU guanamine containing water of crystallization [manufactured by Ajinomoto Fine-Techno Co., Inc.]
   (c-2): anhydrous CTU guanamine [obtained by heat-treating the (c-1) CTU guanamine at 200° C. for one hour under a nitrogen atmosphere]
   (c-3): CTU guanamine containing water of crystallization/ CTU monoguanamine mixture [a mixture comprising 5% weight of water of crystallization and 3% weight of CTU monoguanamine]
   (c-4): CMTU guanamine
   (c-5): 3,9-bis[3-(3,5-diamino-2,4,6-triazaphenyl)-1,1-dimethylpropyl]-2,4,8,10-tetraoxaspiro[5.5]undecane
4. Weather (Light)-resistant Stabilizer "d"
   (d-1): 2-[2'-hydroxy-3',5'-di-t-amylphenyl]benzotriazole
   (d-2): 2-hydroxy-4-oxybenzylbenzophenone
   (d-3): 2-[2'-hydroxy-3',5'-bis($\alpha,\alpha$-dimethylbenzyl)phenyl] benzotriazole
5. Weather (Light)-resistant Stabilizer "e"
   (e-1): bis(2,2,6,6-tetramethyl-4-piperidyl)sebacate
6. Coloring Agent "f"
   (f-1): carbon black (acetylene black)
   (f-2): phthalocyanine-series blue dye
   (f-3): titanium oxide
   (f-4): ultramarine blue
7. Processing stabilizer "g"
   (g-1): ethylenebisstearylamide
   (g-2): polyethylene glycol monostearic acid ester [manufactured by Nippon Oil & Fats Co., Ltd. (NOF Corporation), Nonion S-40)
   (g-3): 12-hydroxy-stearic acid
   (g-4): glycerin monostearate
   (g-5): ethylene glycol distearate
   (g-6): polyethylene glycol (molecular weight 35,000)
8. Heat Stabilizer (Metal Salt of Organic Carboxylic Acid, Alkaline Earth Metal Salt) "h"
   (h-1): calcium 12-hydroxystearate
   (h-2): ionomer [manufactured by Du Pont-Mitsui Polychemicals Co., Ltd., Himilan 1702]
   (h-3): magnesium oxide
   (h-4): calcium citrate
   (h-5): calcium acetate
   (h-6): hydrotalcite [manufactured by Kyowa Chemical Industry Co., Ltd., DHT-4A]
   (h-7): zeolite A-4 [manufactured by Tosoh Corp., Zeolam A-4]
   (h-8): magnesium stearate 9. Heat Stabilizer (Basic Nitrogen-containing Compound, Phosphine Compound) "i"

(i-1): melamine (i-2): melamine-formaldehyde resin, obtained from the following steps, 1.2 mol of formaldehyde relative to 1 mol of melamine was used. The formaldehyde was allowed to react with the melamine in aqueous solution, at pH 8 at 70° C. to produce a melamine-formaldehyde resin (a water-soluble initial or early condensate) without appearance of white turbidity in the reaction system. Then, the reaction system was adjusted to pH 6.5 with stirring and kept or continued with stirring to precipitate a melamine-formaldehyde resin, and a powdered crude melamine-formaldehyde resin was obtained from the precipitant by drying. The powder was washed with warmed water (60° C.) for 30 minutes and filtrated, then the residue was washed with acetone and dried to give a purified melamine-formaldehyde resin as white powder.

(i-3): melem [manufactured by Nissan Chemical Industries, Ltd.]

(i-4): nylon 6-66-610

(i-5): allantoin [manufactured by Kawaken Fine Chemicals Co., Ltd.]

(i-6): allantoin dihydroxyaluminum [manufactured by Kawaken Fine Chemicals Co., Ltd., ALDA]

(i-9): biurea (i-10): triphenylphosphine

TABLE 1

| | | Examples | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Polyacetal resin a | | a-1 | a-1 | a-1 | a-1 | a-2 | a-1 | a-1 | a-1 | a-1 | a-1 | a-1 | a-1 | a-1 | a-1 | a-1 | a-1 |
| (parts by weight) | | 100 | 100 | 100 | 100 | 100 | 100 | 100 | 100 | 100 | 100 | 100 | 100 | 100 | 100 | 100 | 100 |
| Hindered phenol-series compound b | | b-1 | b-2 | b-1 | b-1 | b-1 | b-1 | b-1 | b-1 | b-1 | b-1 | b-1 | b-1 | b-1 | b-1 | b-1 | b-1 |
| (parts by weight) | | 0.03 | 0.03 | 0.03 | 0.03 | 0.03 | 0.03 | 0.03 | 0.03 | 0.03 | 0.03 | 0.03 | 0.03 | 0.03 | 0.03 | 0.03 | 0.03 |
| Spiro-compound c | | c-1 | c-1 | c-1 | c-1 | c-1 | c-1 | c-2 | c-1 | c-1 | c-1 | c-1 | c-1 | c-1 | c-1 | c-1 | c-1 |
| (parts by weight) | | 0.3 | 0.3 | 0.3 | 0.3 | 0.1 | 0.3 | 0.3 | 0.3 | 0.3 | 0.3 | 0.3 | 0.3 | 0.3 | 0.3 | 0.3 | 0.3 |
| Weather (light)-resistant stabilizer | d | d-1 | d-2 | d-3 | d-3 | d-3 | d-3 | d-3 | d-3 | d-3 | d-3 | d-3 | d-3 | d-3 | d-3 | d-3 | d-3 |
| | | 0.5 | 0.25 | 0.4 | 0.4 | 0.4 | 0.4 | 0.4 | 0.4 | 0.4 | 0.4 | 0.4 | 0.4 | 0.25 | 0.4 | 0.4 | 0.4 |
| | e | — | e-1 | e-1 | e-1 | e-1 | e-1 | e-1 | e-1 | e-1 | e-1 | e-1 | e-1 | e-1 | e-1 | e-1 | e-1 |
| (parts by weight) | | | 0.25 | 0.2 | 0.2 | 0.2 | 0.2 | 0.2 | 0.2 | 0.2 | 0.2 | 0.2 | 0.2 | 0.25 | 0.2 | 0.2 | 0.2 |
| Coloring agent f | | — | — | — | — | — | — | — | — | — | — | — | — | f-1 | f-1 | f-2 | f-3 |
| (parts by weight) | | — | — | — | — | — | — | — | — | — | — | — | — | 0.5 | 0.5 | 0.5 | 0.5 |
| Processing stabilizer g (parts by weight) | | — | — | — | g-1 | g-1 | g-2 | g-3 | g-4 | g-5 | g-1 | g-1 | g-3 | g-1 | g-1 | g-1 | g-1 |
| | | — | — | — | 0.2 | 0.2 | 0.2 | 0.2 | 0.2 | 0.2 | 0.2 | 0.2 | 0.2 | 0.2 | 0.2 | 0.2 | 0.2 |
| Heat stabilizer (parts by weight) | h | — | — | — | h-1 | h-1 | h-1 | h-2 | h-3 | h-4 | h-5 | h-6 | h-7 | h-1 | h-1 | h-1 | h-1 |
| | | — | — | — | 0.1 | 0.1 | 0.1 | 0.03 | 0.03 | 0.1 | 0.1 | 0.03 | 0.03 | 0.1 | 0.1 | 0.1 | 0.1 |
| | i | — | — | — | — | — | — | i-1 | i-2 | i-3 | i-4 | i-5 | i-6 | i-5 | i-1 | i-5 | i-5 |
| | | — | — | — | — | — | — | 0.03 | 0.03 | 0.03 | 0.03 | 0.03 | 0.03 | 0.06 | 0.03 | 0.03 | 0.03 |
| Mold deposit | | 1 | 1 | 1 | 1 | 1 | 1 | 1 | 1 | 1 | 1 | 1 | 1 | 2 | 1 | 1 | 1 |
| The amount of formaldehyde emission dry ($\mu g/cm^2$) | | 1.3 | 1.2 | 1.2 | 0.8 | 0.7 | 0.8 | 0.7 | 0.8 | 0.8 | 0.8 | 0.5 | 0.4 | 0.7 | 0.6 | 0.9 | 0.8 |
| The amount of formaldehyde emission humid ($\mu g/cm^2$) | | 2.1 | 2.1 | 2.0 | 1.4 | 1.1 | 1.3 | 1.0 | 1.2 | 1.2 | 0.7 | 0.9 | 0.9 | 1.2 | 1.3 | 1.4 | 1.3 |
| weather (light)-resistant stability | | 3 | 2 | 1 | 1 | 1 | 1 | 1 | 1 | 1 | 1 | 1 | 1 | 1 | 1 | 1 | 1 |

TABLE 2

| | | Examples | | | | | | | | | | | | | |
|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 |
| Polyacetal resin a | | a-1 | a-1 | a-1 | a-1 | a-2 | a-1 | a-1 | a-1 | a-1 | a-1 | a-1 | a-1 | a-1 | a-1 |
| (parts by weight) | | 100 | 100 | 100 | 100 | 100 | 100 | 100 | 100 | 100 | 100 | 100 | 100 | 100 | 100 |
| Hindered phenol-series compound b | | b-1 | b-1 | b-1 | b-1 | b-1 | b-1 | b-1 | b-1 | b-1 | b-1 | b-1 | b-1 | b-1 | b-1 |
| (parts by weight) | | 0.03 | 0.03 | 0.03 | 0.03 | 0.03 | 0.03 | 0.03 | 0.03 | 0.03 | 0.03 | 0.03 | 0.03 | 0.03 | 0.03 |
| Spiro-compound c | | c-1 | c-2 | c-3 | c-4 | c-5 | c-3 | c-3 | c-3 | c-3 | c-3 | c-1 | c-3 | c-3 | c-3 |
| (parts by weight) | | 0.5 | 0.5 | 0.5 | 0.5 | 0.5 | 0.5 | 0.5 | 0.5 | 0.5 | 0.5 | 0.5 | 0.5 | 0.5 | 0.5 |
| Weather (light)-resistant stabilizer | d | d-3 | d-3 | d-3 | d-3 | d-3 | d-3 | d-3 | d-3 | d-3 | d-3 | d-3 | d-3 | d-3 | d-3 |
| | | 0.4 | 0.4 | 0.4 | 0.4 | 0.4 | 0.4 | 0.4 | 0.4 | 0.4 | 0.4 | 0.4 | 0.4 | 0.4 | 0.4 |
| (parts by weight) | e | e-1 | e-1 | e-1 | e-1 | e-1 | e-1 | e-1 | e-1 | e-1 | e-1 | e-1 | e-1 | e-1 | e-1 |
| | | 0.2 | 0.2 | 0.2 | 0.2 | 0.2 | 0.2 | 0.2 | 0.2 | 0.2 | 0.2 | 0.2 | 0.2 | 0.2 | 0.2 |
| Coloring agent f (parts by weight) | | — | — | — | — | — | — | — | — | — | — | — | — | — | — |
| Processing stabilizer g | | g-4 | g-4 | g-4 | g-4 | g-1 | g-4 | g-4 g-6 | g-4 g-6 | g-1 g-6 | g-4 | g-4 | g-4 | g-4 | g-4 |
| (parts by weight) | | 0.3 | 0.3 | 0.3 | 0.3 | 0.3 | 0.3 | 0.3 0.1 | 0.3 0.1 | 0.3 0.1 | 0.3 | 0.3 | 0.3 | 0.3 | 0.3 |
| Heat stabilizer | h | h-1 | h-1 | h-1 | h-1 | h-1 | h-8 | h-1 | h-8 | h-8 | h-1 | h-1 | h-1 | h-1 | h-1 |
| (parts by weight) | | 0.1 | 0.1 | 0.1 | 0.1 | 0.1 | 0.1 | 0.1 | 0.1 | 0.1 | 0.1 | 0.1 | 0.1 | 0.1 | 0.1 |
| | i | — | — | — | — | — | — | — | — | i-1 | i-5 | i-5 | i-7 | i-8 | |
| | | | | | | | | | | 0.03 | 0.03 | 0.03 | 0.03 | 0.1 | |

TABLE 2-continued

|  | Examples |  |  |  |  |  |  |  |  |  |  |  |  |  |
|---|---|---|---|---|---|---|---|---|---|---|---|---|---|---|
|  | 17 | 18 | 19 | 20 | 21 | 22 | 23 | 24 | 25 | 26 | 27 | 28 | 29 | 30 |
| Mold deposit | 1 | 1 | 1 | 1 | 1 | 1 | 1 | 1 | 1 | 1 | 1 | 1 | 1 | 1 |
| The amount of formaldehyde emission dry ($\mu g/cm^2$) | 0.5 | 0.7 | 0.5 | 0.4 | 0.5 | 0.4 | 0.4 | 0.4 | 0.4 | 0.4 | 0.3 | 0.3 | 0.4 | 0.4 |
| The amount of formaldehyde emission humid ($\mu g/cm^2$) | 0.9 | 1.1 | 0.9 | 0.9 | 1.0 | 0.8 | 0.8 | 0.8 | 0.8 | 0.7 | 0.6 | 0.6 | 0.8 | 0.8 |
| weather (light)-resistant stability | 1 | 1 | 1 | 1 | 1 | 1 | 1 | 1 | 1 | 1 | 1 | 1 | 1 | 1 |

TABLE 3

|  |  | Examples |  |  |  |  |  |  |  |  |  |
|---|---|---|---|---|---|---|---|---|---|---|---|
|  |  | 31 | 32 | 33 | 34 | 35 | 36 | 37 | 38 | 39 | 40 |
| Polyacetal resin a |  | a-1 | a-1 | a-1 | a-1 | a-1 | a-1 | a-1 | a-1 | a-1 | a-1 |
| (parts by weight) |  | 100 | 100 | 100 | 100 | 100 | 100 | 100 | 100 | 100 | 100 |
| Hindered phenol-series compound b |  | b-1 | b-1 | b-1 | b-1 | b-1 | b-1 | b-1 | b-1 | b-1 | b-1 |
| (parts by weight) |  | 0.03 | 0.03 | 0.03 | 0.03 | 0.03 | 0.03 | 0.03 | 0.03 | 0.03 | 0.03 |
| Spiro-compound c |  | c-1 | c-1 | c-1 | c-1 | c-3 | c-3 | c-3 | c-4 | c-4 | c-5 |
| (parts by weight) |  | 0.5 | 0.5 | 0.5 | 0.5 | 0.5 | 0.5 | 0.5 | 0.5 | 0.5 | 0.5 |
| Weather (light)-resistant stabilizer | d | d-3 | d-3 | d-3 | d-3 | d-3 | d-3 | d-3 | d-3 | d-3 | d-3 |
| (parts by weight) |  | 0.4 | 0.4 | 0.4 | 0.4 | 0.4 | 0.4 | 0.4 | 0.4 | 0.4 | 0.4 |
|  | e | e-1 | e-1 | e-1 | e-1 | e-1 | e-1 | e-1 | e-1 | e-1 | e-1 |
|  |  | 0.2 | 0.2 | 0.2 | 0.2 | 0.2 | 0.2 | 0.2 | 0.2 | 0.2 | 0.2 |
| Coloring agent f |  | f-1 | f-2 | f-3 | f-4 | f-1 | f-3 | f-4 | f-1 | f-3 | f-1 |
| (parts by weight) |  | 0.5 | 0.5 | 0.5 | 0.5 | 0.5 | 0.5 | 0.5 | 0.5 | 0.5 | 0.5 |
| Processing stabilizer g |  | g-4 | g-4 | g-4 | g-4 | g-4 | g-4 | g-4 | g-4 | g-4 | g-4 |
| (parts by weight) |  | 0.2 | 0.2 | 0.2 | 0.2 | 0.2 | 0.2 | 0.2 | 0.2 | 0.2 | 0.2 |
| Heat stabilizer | h | h-1 | h-1 | h-1 | h-1 | h-1 | h-1 | h-1 | h-1 | h-1 | h-1 |
| (parts by weight) |  | 0.1 | 0.1 | 0.1 | 0.1 | 0.1 | 0.1 | 0.1 | 0.1 | 0.1 | 0.1 |
|  | i | — | — | — | — | — | — | — | — | — | — |
|  |  | — | — | — | — | — | — | — | — | — | — |
| Mold deposit |  | 1 | 1 | 1 | 1 | 1 | 1 | 1 | 1 | 1 | 1 |
| The amount of formaldehyde emission dry ($\mu g/cm^2$) |  | 0.5 | 0.5 | 0.3 | 0.5 | 0.5 | 0.3 | 0.5 | 0.4 | 0.4 | 0.5 |
| The amount of formaldehyde emission humid ($\mu g/cm^2$) |  | 0.9 | 0.9 | 0.6 | 0.9 | 0.9 | 0.6 | 0.9 | 0.9 | 0.8 | 1.0 |
| weather (light)-resistant stability |  | 1 | 1 | 1 | 1 | 1 | 1 | 1 | 1 | 1 | 1 |

TABLE 4

|  |  | Comparative Examples |  |  |  |  |
|---|---|---|---|---|---|---|
|  |  | 1 | 2 | 3 | 4 | 5 |
| Polyacetal resin a |  | a-1 | a-1 | a-1 | a-1 | a-1 |
| (parts by weight) |  | 100 | 100 | 100 | 100 | 100 |
| Hindered phenol-series compound b |  | b-1 | b-1 | b-1 | b-1 | b-1 |
| (parts by weight) |  | 0.03 | 0.03 | 0.03 | 0.03 | 0.03 |
| Spiro-compound c |  | — | c-1 | — | c-1 | — |
| (parts by weight) |  | — | 0.3 | — | 0.3 | — |
| Weather (light)-resistant stabilizer | d | d-3 | — | d-3 | — | d-3 |
| (parts by weight) |  | 0.4 | — | 0.4 | — | 0.4 |
|  | e | e-1 | — | e-1 | — | e-1 |
|  |  | 0.2 | — | 0.2 | — | 0.2 |
| Coloring agent f |  | — | — | — | — | — |
| (parts by weight) |  |  |  |  |  |  |
| Processing stabilizer g |  | — | — | g-1 | g-1 | — |
| (parts by weight) |  | — | — | 0.2 | 0.2 | — |
| Heat stabilizer | h | — | — | h-1 | h-1 | — |
| (parts by weight) |  | — | — | 0.1 | 0.1 | — |
|  | i | — | — | — | — | i-1 |
|  |  | — | — | — | — | 0.3 |
| Mold deposit |  | 3 | 1 | 2 | 1 | 5 |
| The amount of formaldehyde emission dry ($\mu g/cm^2$) |  | 3.3 | 1.0 | 3.0 | 0.8 | 1.5 |
| The amount of formaldehyde emission humid ($\mu g/cm^2$) |  | 3.9 | 1.6 | 3.4 | 1.4 | 2.1 |
| weather (light)-resistant stability |  | 3 | 5 | 1 | 5 | 1 |

It will be apparent from Tables that as compared with the resin compositions of Comparative Examples, the resin compositions according to Examples have smaller amount of mold deposit on the molding and are improved in moldability. Moreover, the resin composition according to Examples are considerably decreased or reduced the amount of formaldehyde emission, and are improved in weather (light)-resistant stability on the shaped or molded articles.

What is claimed is:

1. A polyacetal resin composition comprising a polyacetal resin, a hindered phenol-series compound, a weather (light)-resistant stabilizer, and a spiro-compound having a triazine ring.

2. A polyacetal resin composition according to claim 1, wherein the weather (light)-resistant stabilizer comprises at least one member selected from the group consisting of a benzotriazole-series compound, a benzophenone-series compound, an aromatic benzoate-series compound, a cyanoacrylate-series compound, an oxalic anilide-series compound, and a hindered amine-series compound.

3. A polyacetal resin composition according to claim 1, wherein the weather (light)-resistant stabilizer comprises at least a benzotriazole compound.

4. A polyacetal resin composition according to claim 1, wherein the weather (light)-resistant stabilizer comprises a benzotriazole-series compound and a hindered amine-series compound.

5. A polyacetal resin composition according to claim 1, wherein the weather (light)-resistant stabilizer comprises a benzotriazole-series compound and a hindered amine-series compound and the ratio of the hindered amine-series compound relative to the benzotriazole-series compound is 0/100 to 80/20 by weight ratio.

6. A polyacetal resin composition according to claim 1, wherein the spiro-compound has two guanamine rings as its end groups.

7. A polyacetal resin composition according to claim 1, wherein the spiro-compound is a compound represented by the following formula (1):

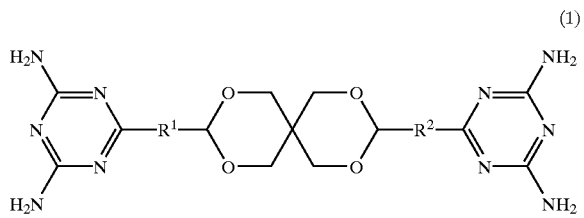

wherein $R^1$ and $R^2$ are the same or different, each representing an alkylene group, an arylene group, or an aralkylene group.

8. A polyacetal resin composition according to claim 7, the groups $R^1$ and $R^2$ in the formula (1) are straight- or branched-chain $C_{1-10}$ alkylene groups.

9. A polyacetal resin composition according to claim 1, wherein the spiro-compound comprises a 3,9-bis[(3,5-diamino-2,4,6-triazaphenyl)$C_{1-6}$alkyl]-2,4,8,10-tetraoxaspiro[5.5]undecane.

10. A polyacetal resin composition according to claim 1, wherein the spiro-compound comprises at least one member selected from the group consisting of 3,9-bis[2-(3,5-diamino-2,4,6-triazaphenyl)ethyl]-2,4,8,10-tetraoxaspiro[5.5]undecane, 3,9-bis[1-(3,5-diamino-2,4,6-triazaphenyl)methyl]-2,4,8,10-tetraoxaspiro[5.5]undecane and 3,9-bis[3-(3,5-diamino-2,4,6-triazaphenyl)-1,1-dimethylpropyl]-2,4,8,10-tetraoxaspiro[5.5]undecane.

11. A polyacetal resin composition according to claim 1, wherein the spiro-compound comprises 3,9-bis[2-(3,5-diamino-2,4,6-triazaphenyl)ethyl]-2,4,8,10-tetraoxaspiro[5.5]undecane.

12. A polyacetal resin composition according to claim 1, wherein the spiro-compound comprises an anhydrous compound or a compound containing water of crystallization.

13. A polyacetal resin composition according to claim 1, wherein the spiro-compound comprises a 3,9-bis[(3,5-diamino-2,4,6-triazaphenyl)straight or branched $C_{1-5}$alkyl]-2,4,8,10-tetraoxaspiro[5.5]undecane containing water of crystallization.

14. A polyacetal resin composition according to claim 1, wherein the spiro-compound comprises a 3,9-bis[(3,5-diamino-2,4,6-triazaphenyl)alkyl]-2,4,8,10-tetraoxaspiro[5.5]undecane and a 3-(cyanoalkyl)-9-[(3,5-diamino-2,4,6-triazaphenyl)alkyl]-2,4,8,10-tetraoxaspiro[5.5]undecane.

15. A polyacetal resin composition according to claim 1, wherein the spiro-compound comprises a 3,9-bis[(3,5-diamino-2,4,6-triazaphenyl)$C_{1-6}$alkyl]-2,4,8,10-tetraoxaspiro[5.5]undecane and a 3-(cyano$C_{1-6}$alkyl)-9-[(3,5-diamino-2,4,6-triazaphenyl)$C_{1-6}$alkyl]-2,4,8,10-tetraoxaspiro[5.5]undecane.

16. A polyacetal resin composition according to claim 1, which comprises, relative to 100 parts by weight of the polyacetal resin, 0.001 to 5 parts by weight of the hindered phenol-series compound, 0.01 to 5 parts by weight of the weather (light)-resistant stabilizer, and 0.001 to 10 parts by weight of the spiro-compound.

17. A polyacetal resin composition according to claim 1, wherein the weather (light)-resistant stabilizer comprises a hindered amine-series compound and a benzotriazole-series compound in a weight ratio of 10/90 to 70/30 (the former/the latter), and the ratio of the weather (light)-resistant stabilizer relative to the spiro-compound is 0.01/1 to 30/1 by weight ratio.

18. A polyacetal resin composition according to claim 1, which further comprises a coloring agent.

19. A polyacetal resin composition according to claim 18, wherein the coloring agent comprises a carbon black.

20. A polyacetal resin composition according to claim 1, which further comprises at least one member selected from a processing stabilizer and a heat stabilizer.

21. A polyacetal resin composition according to claim 20, wherein the processing stabilizer comprises at least one member selected from the group consisting of a long-chain or higher fatty acid or its derivative, a polyoxyalkylene glycol and a silicone compound.

22. A polyacetal resin composition according to claim 20, wherein the heat stabilizer comprises at least one member selected from the group consisting of a basic nitrogen-containing compound, a phosphine compound, a metal salt of an organic carboxylic acid, an alkaline or alkaline earth metal compound, hydrotalcite, and zeolite.

23. A process for producing a polyacetal resin composition, which comprises mixing a polyacetal resin, a hindered phenol-series compound, a weather (light)-resistant stabilizer, and a spiro-compound having a triazine ring.

24. A polyacetal resin shaped article made with a polyacetal resin composition recited in claim 1.

25. A polyacetal resin shaped article according to claim 24, wherein (1) the emission of formaldehyde from which upon 24-hour standing in a closed space at a temperature of 80° C. is not larger than 1.5 µg per $cm^2$ of surface area of the article, and/or (2) the emission of formaldehyde from which upon 3-hour standing in a closed space of saturated humidity at a temperature of 60° C. is not larger than 2.5 µg per $cm^2$ surface area of the article.

26. A polyacetal resin shaped article according to claim 24, which is at least one member selected from the group consisting of an automotive part, an electric or electronic device part, an architectural or pipeline part, a household utensil or cosmetic article part, and a medical device part.

* * * * *